(12) United States Patent
Norstad et al.

(10) Patent No.: US 6,469,845 B1
(45) Date of Patent: Oct. 22, 2002

(54) FLEXIBLE LENS MOUNT

(75) Inventors: Timothy P. Norstad, Turtle Lake, WI (US); Michael A. Fry, Stillwater, MN (US); James B. Drost; Brian A. McIevish, both of Saint Paul, MN (US); Michael J. Juen, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/909,335

(22) Filed: Jul. 19, 2001

(51) Int. Cl.[7] .................................................. G02B 7/02
(52) U.S. Cl. ........................ 359/819; 359/827; 359/830
(58) Field of Search ................................. 359/811, 819, 359/827, 830; 353/100; 396/529

(56) References Cited

U.S. PATENT DOCUMENTS

| | | | | |
|---|---|---|---|---|
| 3,884,561 A | * | 5/1975 | Kodys .......................... 351/83 |
| 4,302,076 A | * | 11/1981 | Hashimoto ................... 359/830 |
| 4,929,054 A | * | 5/1990 | Ahmad et al. ............... 359/820 |
| 5,052,782 A | * | 10/1991 | Myer .......................... 359/827 |
| 6,108,025 A | | 8/2000 | Li et al. ...................... 347/256 |

* cited by examiner

Primary Examiner—Georgia Epps
Assistant Examiner—Saeed Seyrafi
(74) Attorney, Agent, or Firm—Susan L. Parulski

(57) ABSTRACT

A flexible lens mount for securing a flexible lens having a first side and a second side opposite the first side. The flexible lens mount comprises a resilient member, a base member, and a fastener. The resilient member includes a first end, a second end, and a first surface adapted to abut the second side of the flexible lens. The resilient member is adapted to be flexed to form a first arc of about degrees D of about radius R. The base member includes a second surface forming a second arc which complements the first arc. The second surface is adapted to abut the first side of the flexible lens such that the flexible lens is disposed intermediate the first and second surfaces. The base member further comprises a first retaining member disposed at one end to retain the first end of the resilient member, and a second retaining member disposed at an other end to retain the second end of the resilient member. The fastener abuts either the first or second end of the resilient member to exert a force to secure the resilient member relative to the base member.

21 Claims, 7 Drawing Sheets

FLEXIBLE LENS MOUNT

FIELD OF THE INVENTION

The present invention relates generally to a lens mount, and more particularly, to a mount for a flexible lens.

BACKGROUND OF THE INVENTION

A lens is a well known optical element comprised of a transparent material used to make light rays converge or diverge to form an image. The transparent material comprising the lens may be comprised of various materials, including a rigid material (i.e., a non-flexible material) such as glass, or a flexible material such as a thin plastic.

Lenses are used in many types of equipment. In the health imaging area, lenses are used in laser imaging systems commonly used to produce photographic images from digital image data such as generated by magnetic resonance (MR) or computed tomography (CT). Such laser imaging systems typically include a laser imager for exposing the image (from the digital image data) onto photosensitive film. The photosensitive film can be, for example, a transparency film, thereby providing what is commonly referred to as an x-ray.

U.S. Pat. No. 6,108,025 (Li et al.), commonly assigned and incorporated herein by reference, discloses an optical scanner system of a laser imaging system comprising a plurality of lenses, including a rigid lens and a flexible lens.

Care needs to be taken when mounting lenses. Particular care must be taken when mounting a flexible lens since the shape/location of the flexible lens must be retained. Yet, the mount of the flexible lens must provide easy removal and replacement such as during maintenance, and not create debris either during manufacturing, shipping, or use. For example, if an adhesive or epoxy is employed, delamination of the adhesive is a potential problem. Still further, the mount of the flexible lens must not create debris during regular maintenance. For example, if the mount employs an adhesive or epoxy, particles of hardened adhesive/epoxy might break off thereby causing debris in the laser imaging system, or could remain adhered to the mount thereby causing problems with the installation of a replacement flexible lens.

Accordingly, a need continues to exist for a mount for a flexible lens. Such a mount needs to retain the shape/location of the flexible lens, provide for ease of removal and replacement such as during maintenance, not create debris either during manufacturing, shipping, use, or regular maintenance, and not adversely affect the installation of a replacement flexible lens.

SUMMARY OF THE INVENTION

An object of the present invention is to provide a mount for a flexible lens.

Another object of the invention is to provide such a flexible lens mount which retains the shape/location of the lens, provides for ease of removal/replacement, and not create debris during removal/replacement.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a flexible lens mount for securing a flexible lens having a first side and a second side opposite the first side. The flexible lens mount comprises a resilient member, a base member, and a fastener. The resilient member includes a first end, a second end, and a first surface adapted to abut the second side of the flexible lens. The resilient member is adapted to be flexed to form a first arc of about degrees D of about radius R. The base member includes a second surface forming a second arc which complements the first arc. The second surface is adapted to abut the first side of the flexible lens such that the flexible lens is disposed intermediate the first and second surfaces. The base member further comprises a first retaining means disposed at one end to retain the first end of the resilient member, and a second retaining means disposed at an other end to retain the second end of the resilient member. The fastener abuts either the first or second end of the resilient member to exert a force to secure the resilient member relative to the base member.

According to another aspect of the invention, there is provided a flexible lens mount for securing a flexible lens having a first side and a second side opposite the first side. The flexible lens mount comprises a resilient member, a base member, and a fastener. The resilient member forms about a 180 degree arc and includes (i) a first surface adapted to abut the second side of the flexible lens, (ii) a first end, and (iii) a second end having a leg and an opening disposed on the leg. The base member forms about a 180 degree arc and includes (i) a first surface adapted to abut the first side of the flexible lens such that the flexible lens is disposed intermediate the base member and the resilient' member, (ii) a channel disposed at one end to receive therein the first end of the resilient member, and (iii) an opening disposed at another end in axial alignment with the opening of the leg. The fastener is adapted to be positioned within the opening of the base member and the opening of the leg to exert a force to secure the flexible lens against the base member.

The present invention provides a flexible lens mount which retains the shape/location of the lens, provides for ease of removal/replacement, and not create debris during removal/replacement.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
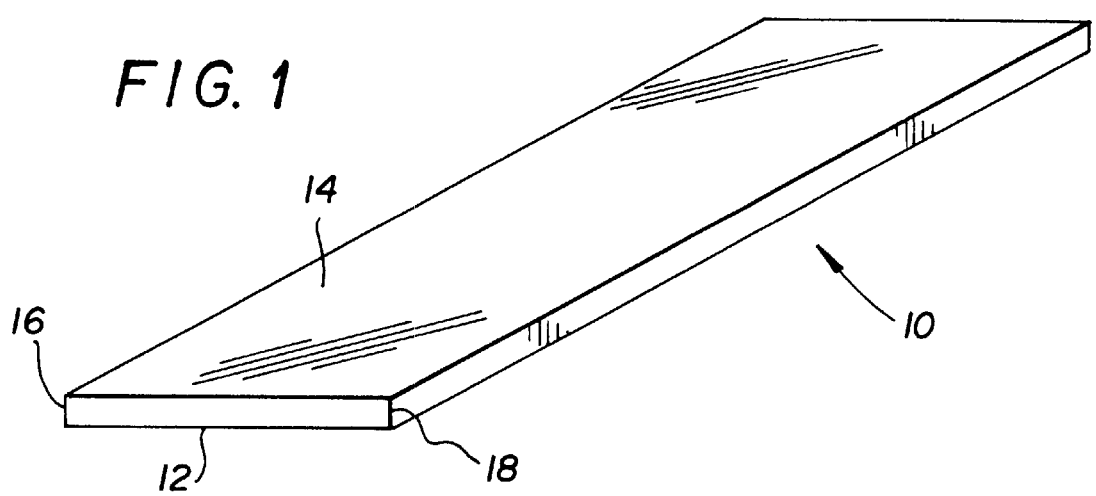
FIG. 1 shows a perspective view of an flexible lens suitable for use with the flexible lens mount of the present invention.

The following is a detailed description of the preferred embodiments of the invention, reference being made to the drawings in which the same reference numerals identify the same elements of structure in each of the several figures.

FIG. 1 shows a flexible lens 10 suitable for use with the flexible lens mount of the present invention. In the figure, in an unflexed position, flexible lens 10 is comprised of a planar first side 12 disposed opposite a planar second side 14, and a planar third side 16 disposed opposite a planar fourth side 18.

Figure 2:
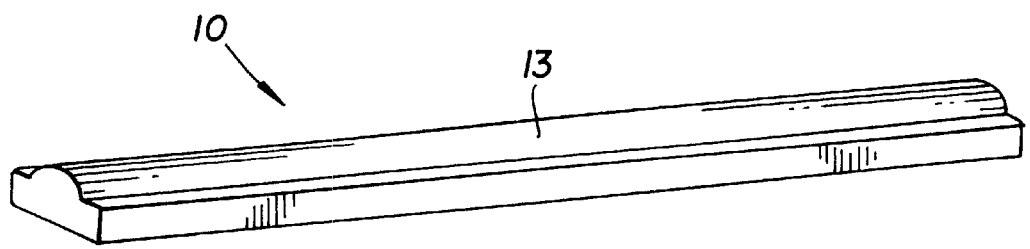
FIG. 2 shows an alternate embodiment of a flexible lens suitable for use with the flexible lens mount of the present invention.

Those skilled in the art will recognize that flexible lens 10 may have a configuration other than as illustrated in FIG. 1. For example, as disclosed in U.S. Pat. No. 6,108,025 (Li et al.), flexible lens 10 may be a cylinder lens having a plano-convex optical configuration as shown in FIG. 2. A plano-convex cylinder lens is a lens having a straight side (i.e., planar) and a convex or curved opposite side. Accordingly, flexible lens 10 could be configured to include a curved portion 13. As will become apparent, such a flexible lens would be suitable for use with the flexible lens mount of the present invention since it includes a planar surface for mounting. While other configurations of flexible lens 10 may be employed with the flexible lens mount of the present invention, for ease of discussion the present invention will be discussed with reference to flexible lens 10 as illustrated in FIG. 1.

The lens mount of the present invention preferably employs flexible lens 10 comprised of a generally flexible material which allows flexible lens 10 to be easily shaped to a desired curvature. For example, a optical scanner assembly as disclosed in U.S. Pat. No. 6,108,025 (Li et al.), commonly assigned and incorporated herein by reference, employs a flexible lens flexed to about a 180 degree arc. Flexible lens 10 is flexible enough to be wrapped onto a retainer or mount, as will be more particularly described below. Flexible lens 10 is preferably capable of being uniformly flexed to a desired arc while maintaining and exhibiting diffraction limited optical characteristics, and as such, allows flexible lens 10 to be used in a laser imaging system suitable for medical applications. In a preferred embodiment, flexible lens 10 is flexed to about a 180 degree arc.

Figure 3:
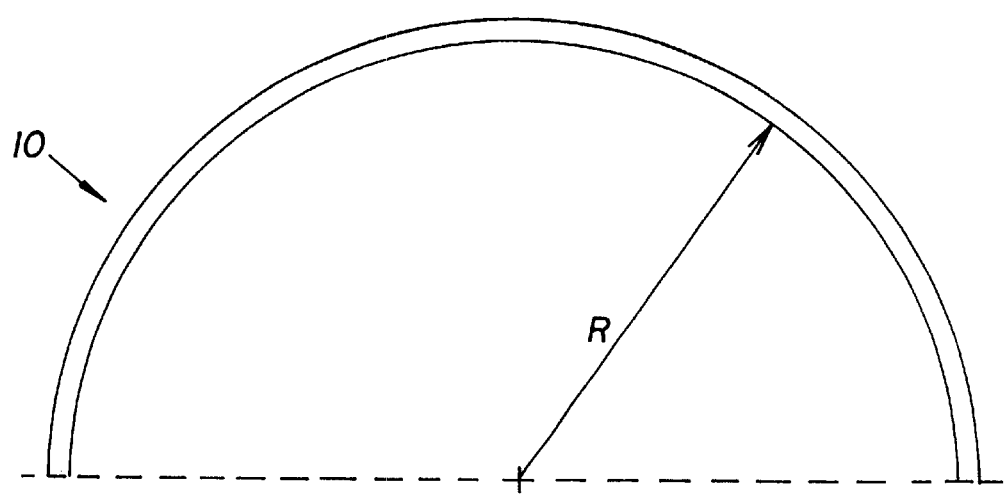
FIG. 3 shows a top view of the flexible lens shown in FIG. 1 in a curved position.

As illustrated in FIG. 1, flexible lens 10 is shown as a relatively thin, ribbon-like lens. In a preferred embodiment, flexible lens 10 can be easily bent into arbitrary shapes, such as a 180 degree arc as shown in FIG. 3. Flexible lens 10 can be utilized in a one-dimensional laser scanning system, in which a beam of light is scanned over a considerable distance (many inches), such as the laser imaging system disclosed in U.S. Pat. No. 6,108,025 (Li et al.).

Continuing to refer to FIG. 3, flexible lens 10 can be flexed to an arc having a radius R, allowing flexible lens 10 to be used in many applications which require the use of a flexible lens, either for obtaining desired optical characteristics or due to space constraints, without causing damage to the lens or damaging the optical characteristics of the lens. The arc may be of any value, it could be less than 45 degrees, it could range to a 180 degree arc, or it could range beyond 180 degrees. Flexible lens 10 is preferably capable of being "flexed" or "bent" in an arc while exhibiting and maintaining diffraction limited optical characteristics. A method of construction of one embodiment of flexible lens 10 is described in U.S. Pat. No. 6,108,025 (Li et al.).

Figure 4:
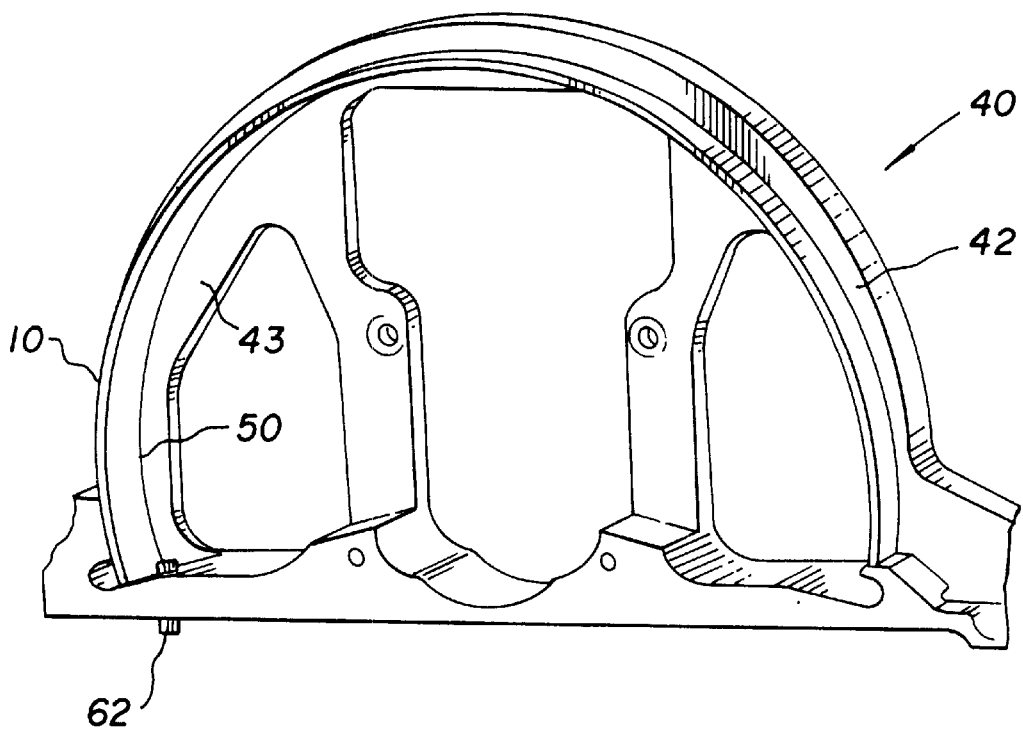
FIG. 4 shows a perspective view of a first embodiment of a flexible lens mount in accordance with the present invention.
Figure 5:
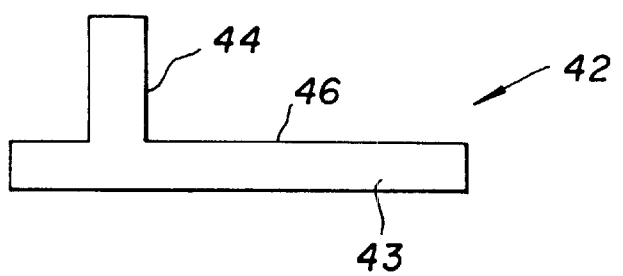
FIG. 5 shows a cross sectional view of a base member of the flexible lens mount.

Referring now to FIGS. 4–10, a first embodiment of a flexible lens mount in accordance with the present invention is shown as flexible lens mount 40. Flexible lens mount 40 includes a base member 42 having a support member 43 and a surface 44 (substantially planar in cross-section) extending from support member 43 to form about a 180 degree arc having a radius. Surface 44 is adapted to abut a surface/side of flexible lens 10. Base member 42 may optionally include a substantially planar surface 46 for supporting another surface/side of flexible lens 10. If base member 42 includes surface 46, then surfaces 44,46 are preferably perpendicular to each other, as shown in FIG. 5.

Base member 42 may be comprised of any sufficiently ridged material such as aluminum, plastic, or glass.

Flexible lens mount 40 further includes a retainer member 50 having a first retainer end 52 and a second retainer end 54. In an unflexed position, retainer member 50 comprises at least one planar side, and preferably has a rectangular cross section. Retainer member 50 is a resilient member or spring member sufficiently flexible to form an arc having a radius which complements surface 44 of base member 42. As such, the arc formed by retainer member 50 is substantially concentric with surface 44. When flexible lens 10 is mounted in flexible lens mount 40, flexible lens 10 is disposed intermediate base member 42 and retainer member 50. Accordingly, when retainer member 50 is compressed against flexible lens 10 and constrained at first and second retainer ends 52,54, holds flexible lens 10 against surface 44 of base member 42 to retain flexible lens 10 in a fixed position. Therefore, retainer member 50 is preferably comprised of a single/unitary flexible material under compression. For this first embodiment, retainer member 50 forms an approximately 180 degree arc when constrained on both ends so as to mate/abut with surface 44.

First retainer end 52 is constrained to base member 42. In a preferred embodiment illustrated in FIGS. 8–9, first retainer end 52 of retainer member 50 is constrained in a channel 56 formed in support member 43 in a direction parallel to surface 44.

Figure 7:
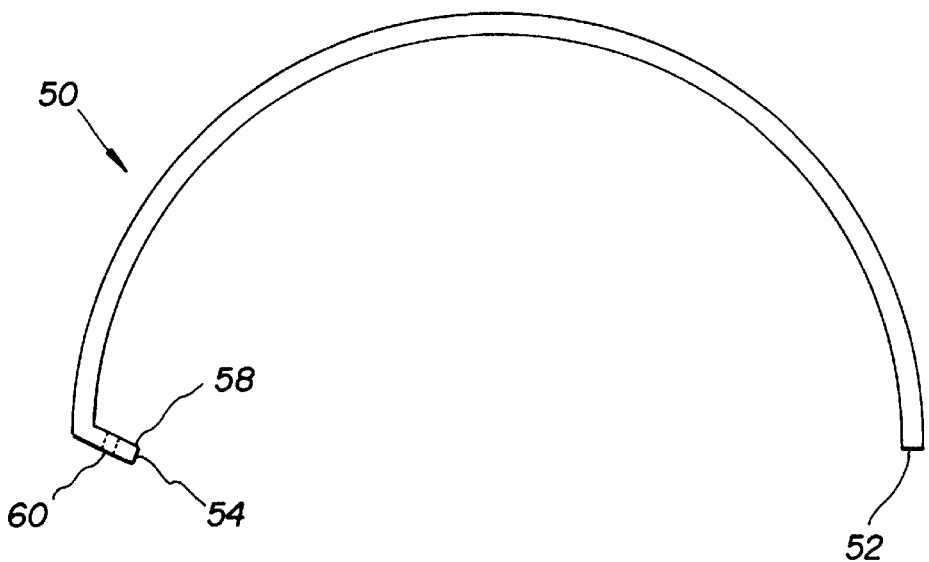
FIG. 7 shows a top view of a retainer member in accordance with the present invention
Figure 8:
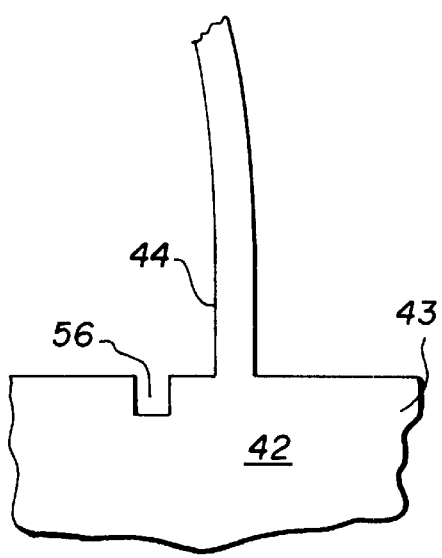
FIG. 8 shows a top view of one end of the base member showing a channel.

A force is applied to retainer member 50 as second retainer end 54 to bias retainer member 50 toward base member 42. In this first embodiment, the force is applied by employing a leg 58. More particularly, a portion of second retainer end 54 of retainer member 50 is bent to form leg 58 having an opening 60 disposed therethrough. The angle to form leg 58 may be of any angle sufficient to provide engagement with a fastener 62. In FIG. 7, leg 58 is formed at a 90 degree angle.

Figure 10:
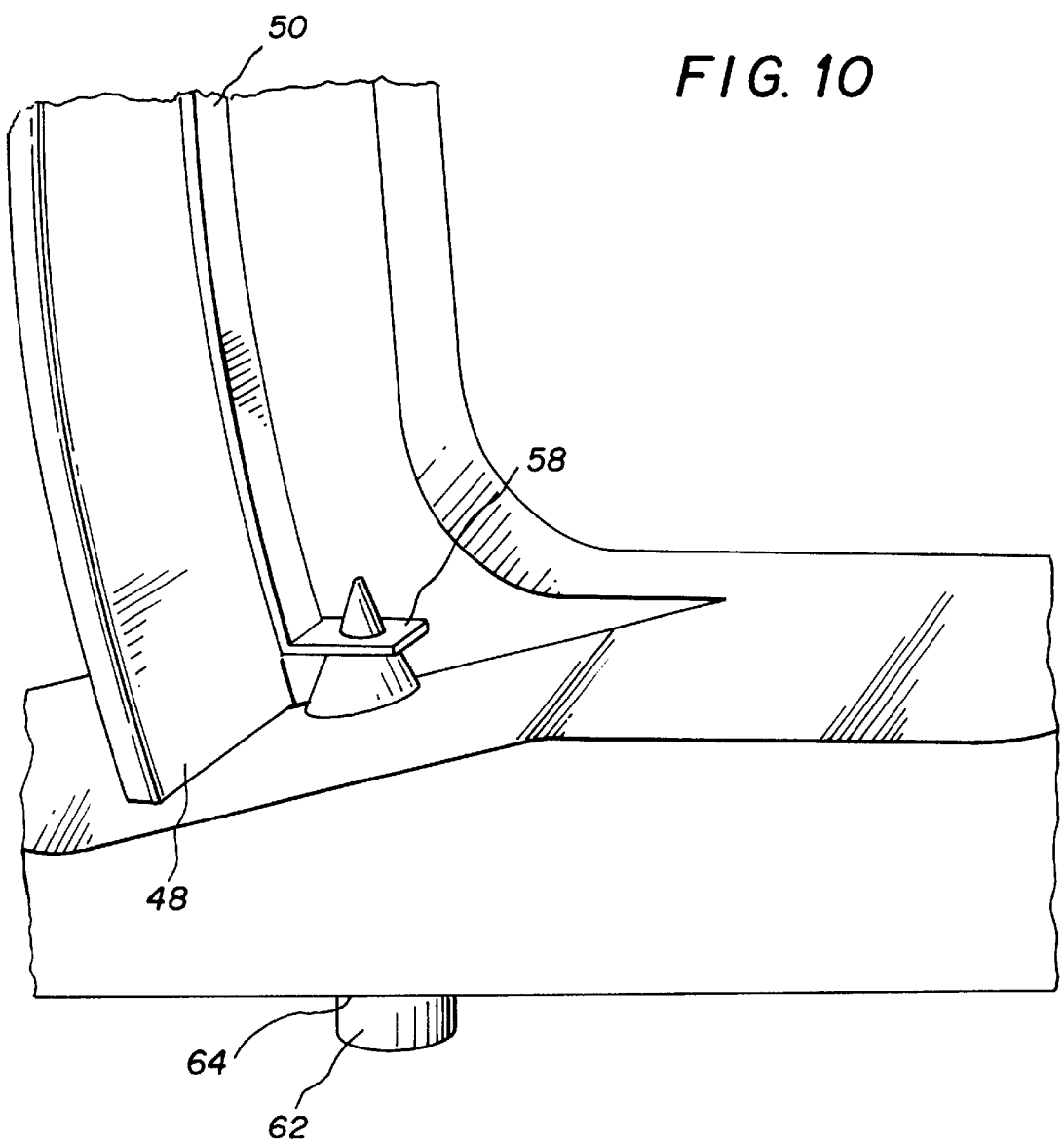
FIG. 10 shows a perspective view of a second end of the base member showing the retainer member mounted therewith.

Fastener 62 is employed to secure retainer member 50 to base member 42 and thereby secure flexible lens 10 therebetween. As best illustrated in FIG. 10, fastener 62 is disposed in an opening 64 in base member 42 as well as opening 60 in retainer member 50, the two openings being arranged so as to be aligned along a common axis. Preferably, opening 60 has a diameter smaller than a diameter of fastener 62. Fastener 62 may be a setscrew or other mechanical fastener known to those skilled in the art. FIG. 10 shows fastener 62 as a conical tipped setscrew.

When mounted in flexible lens mount 40, flexible lens 10 is disposed intermediate base member 42 and retainer member 50, with retainer member 50 biasing flexible lens 10 toward base member 42. To mount flexible lens 10, flexible lens 10 is placed adjacent base member 42, with flexible lens 10 placed on the inside of the arc formed by base member 42 (i.e., the side directed toward the center of the arc). Preferably, a surface of flexible lens 10 is disposed adjacent surface 44 of base member 42. For flexible lens 10 illustrated in FIG. 1, first side 12 of flexible lens 10 abuts surface 44 of base member 42, and fourth side 18 of flexible lens 10 abuts surface 46 of base member 42.

Figure 6:
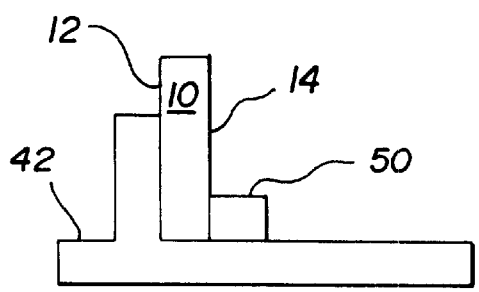
FIG. 6 shows the cross sectional view of the base member of FIG. 5 having the flexible lens mounted therewith.

Next, retainer member 50 is disposed adjacent a surface/side/portion of flexible lens 10. For flexible lens 10 illustrated in FIG. 1, retainer member 50 is disposed adjacent second side 14 of flexible lens 10, as best illustrated in FIG. 6.

Figure 9:
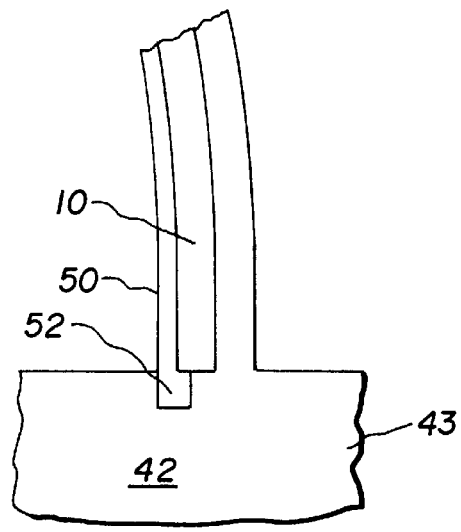
FIG. 9 shows a top view of the one end of the base member of FIG. 8 showing one end of the retainer member disposed within the channel.

First retainer end 52 of retainer member 50 is then disposed within channel 56 of base member 42 as shown in FIG. 9. Fastener 62 is placed through opening 64 and opening 60 to secure second retainer end 54 to base member 42 as shown in FIG. 10.

Fastener 62 controls the amount of force retainer member 50 exerts against flexible lens 10. The force applied by fastener 62 must be sufficient to maintain continuous contact of flexible lens 10 with retainer member 50 to overcome any expansion or contraction that may occur with temperature changes. Leg 58 formed in second retainer end 54 serves as both the point of contact for retainer member 50 to set the tension, and also provides a reserve force to assist in maintaining continuous compression of retainer member 50 during thermal expansion and contraction of both retainer member 50 and base member 42.

Accordingly, fastener 62 is positioned/tightened until sufficient tension is placed onto retainer member 50 to clamp/secure/position flexible lens 10 to base member 42. For Applicants' particular application, six inch ounces was determined to be a preferred minimum torque to sufficiently secure flexible lens 10 when leg 58 was configured as 3.5 mm. If required, the length of leg 58 may be changed to provide additional leverage and reserve spring force.

Retainer member 50 may be pre-formed to an arc to provide ease of assembly, however, it need not be pre-formed. Preferably retainer member 50 is comprised of a spring steel under compression. A type 301 stainless spring steel has been employed for its flexibility and corrosion resistance. Both stainless steel and tempered steel have been employed, including a 0.028 inch thick blue tempered steel and a 0.015 thick spring tempered stainless steel. For the blue tempered steel, it was determined that the bend be heated prior to forming. Those skilled in the art will recognize that, dependent on the size of the retainer member, there may be other suitable materials.

The thickness of flexible lens 10 and retainer member 50 is dependent on the radius of the arc formed by flexible lens 10 and retainer member 50. Correspondingly, the force required by retainer member 50 to secure flexible lens 10 is dependent on the radius of the arc. A sufficient amount of force is required to retain the flexible lens in place. A person skilled in the art is able to determine the necessary force based on the application and environmental conditions encountered.

Figure 11:
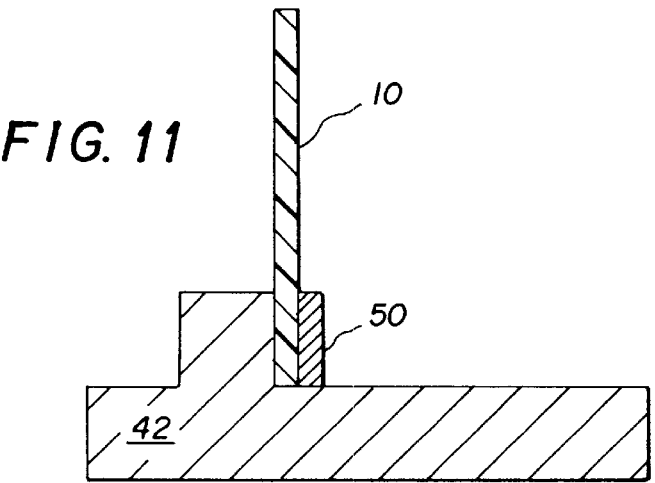
FIG. 11 shows a cross sectional view of an alternate configuration for mounting one end of the retainer member.
Figure 12:
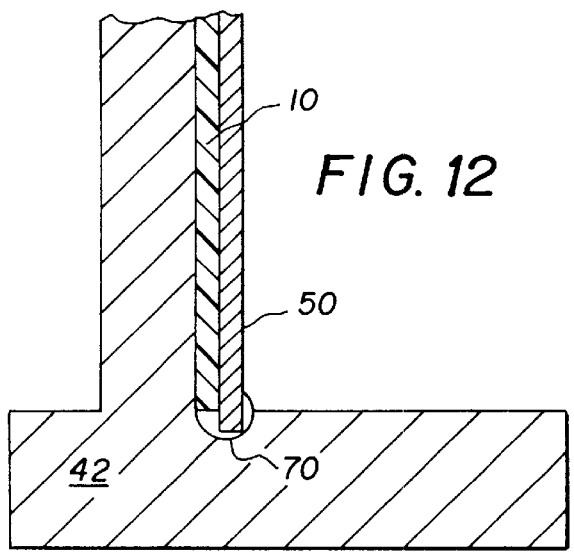
FIG. 12 shows a cross sectional view of a further alternate configuration for mounting one end of the retainer member.

Other means may be employed to constrain first retainer end 52 to base member 42. For example, as illustrated in FIG. 11, flexible lens 10 may be disposed intermediate retainer member 50 and surface 44 of base member 42. That is, the biasing of retainer member 50 toward base member 42 positions first retainer end 52; a channel or slot in support member 43 is not required. Alternatively, as illustrated in FIG. 12, support member 43 may include a groove or recess 70 adapted to receive both flexible lens 10 and first retainer end 52.

Figure 13:
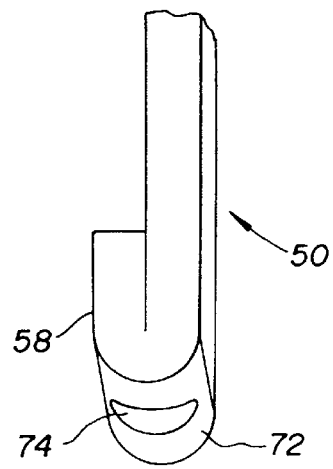
FIG. 13 shows a perspective view of one end of the retainer member.
Figure 14:
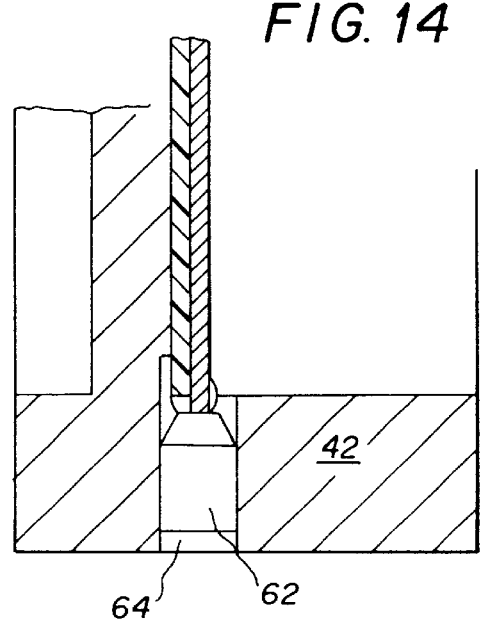
FIG. 14 shows a cross sectional view of yet a further alternate configuration for mounting one end of the retainer member.

In addition, other means may be employed to constrain second retainer end 52 to base member 42. For example, as illustrated in FIG. 13, leg 58 of second retainer end 52 is folded over onto itself to form a curved portion 72. An opening 74 is disposed in curved portion 72. Referring now to FIG. 14, fastener 62 is disposed in opening 64 in base member 42 as well as opening 74 in retainer member 50, the two openings 64,74 being arranged so as to be aligned along a common axis. Preferably, opening 74 has a diameter smaller than the a diameter of fastener 62. Fastener 62 controls the amount of force retainer member 50 exerts against flexible lens 10.

Figure 15:
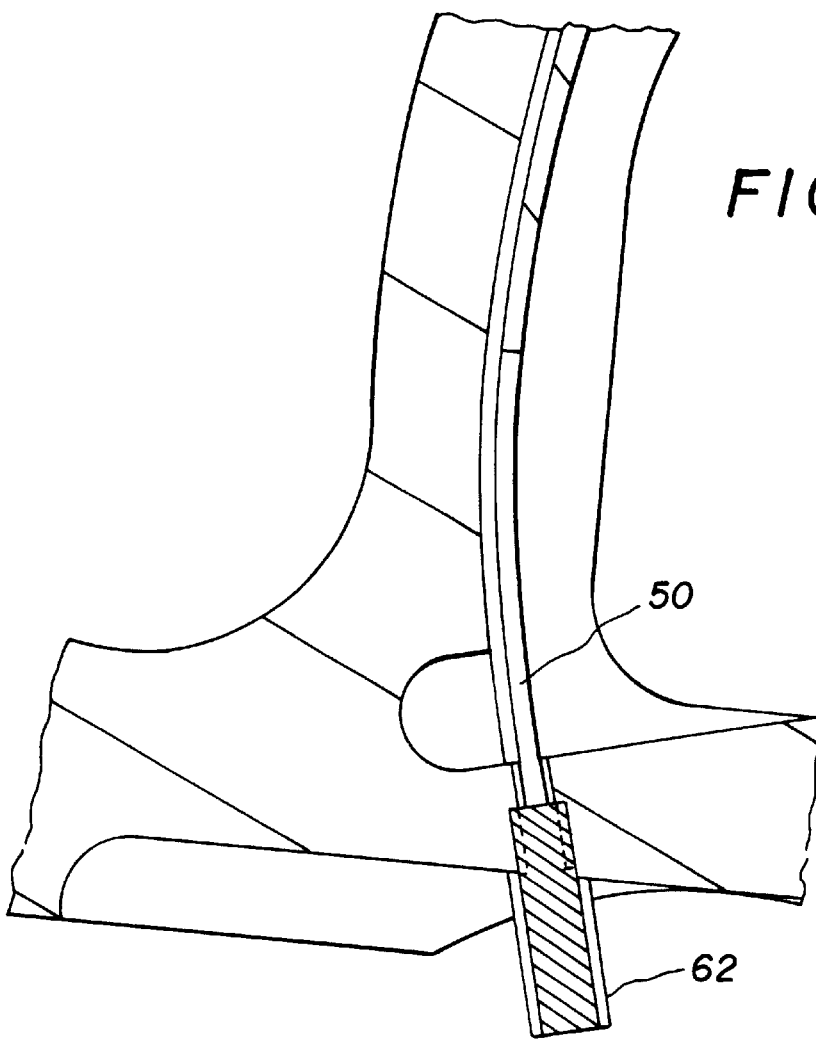
FIG. 15 shows a cross sectional view of a still further alternate configuration for mounting one end of the retainer member.

An alternative means for constraining second retainer end 52 is illustrated in FIG. 15 wherein second retainer end 52 is not bent and is being torqued directly by fastener 62.

Figure 16:
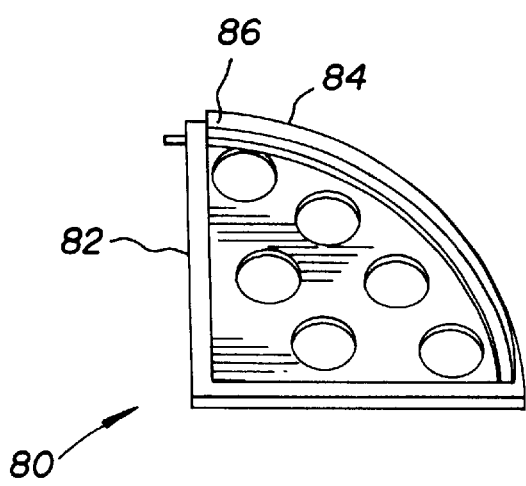
FIG. 16 shows a perspective view of a second embodiment of a flexible lens mount in accordance with the present invention.

As discussed above, the flexible lens mount of the present invention may be employed to mount a flexible lens of varying radius and varying arc. The first embodiment illustrated in FIG. 4 shows a flexible lens mount for a flexible lens having an arc of about 180 degrees. FIG. 16 shows a second embodiment of a flexible lens mount 80 for a flexible lens having an arc of about 45 degrees. A surface 86 extends from support member 84 to form about a 45 degree arc having a radius. Surface 86 is adapted to abut a surface/side of the 25 flexible lens. The retainer member is configured to complement surface 86, with the first and second retainer ends being retained as disclosed above with respect to the first embodiment. As such, the arcs are substantially concentric.

Figure 17:
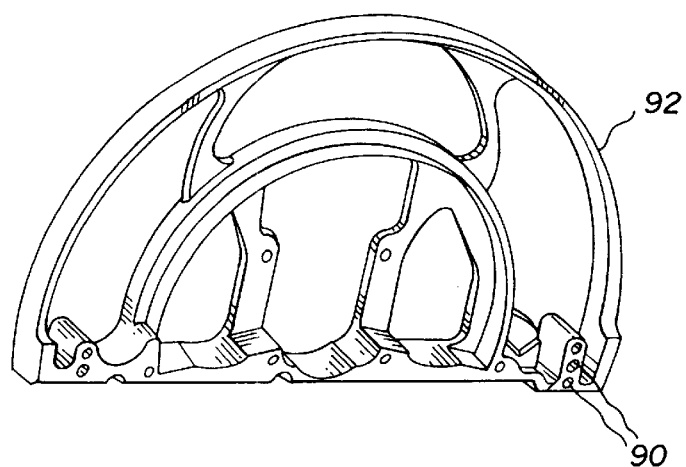
FIG. 17 shows a perspective view of the first embodiment of the flexible lens mount showing two base members mounted radially from each other.

Those skilled in the art will recognize that base member 42 may comprise other members not directed to a flexible lens mount. For example, as 30 illustrated in FIG. 17, base member 42 comprises slots 90 for mounting flexible lens mount 40 to the laser imaging system. Alternatively, base member 42 may include a second arced surface 92 radially offset from surface 44 for supporting another (i.e., second) flexible lens.

Figure 18:
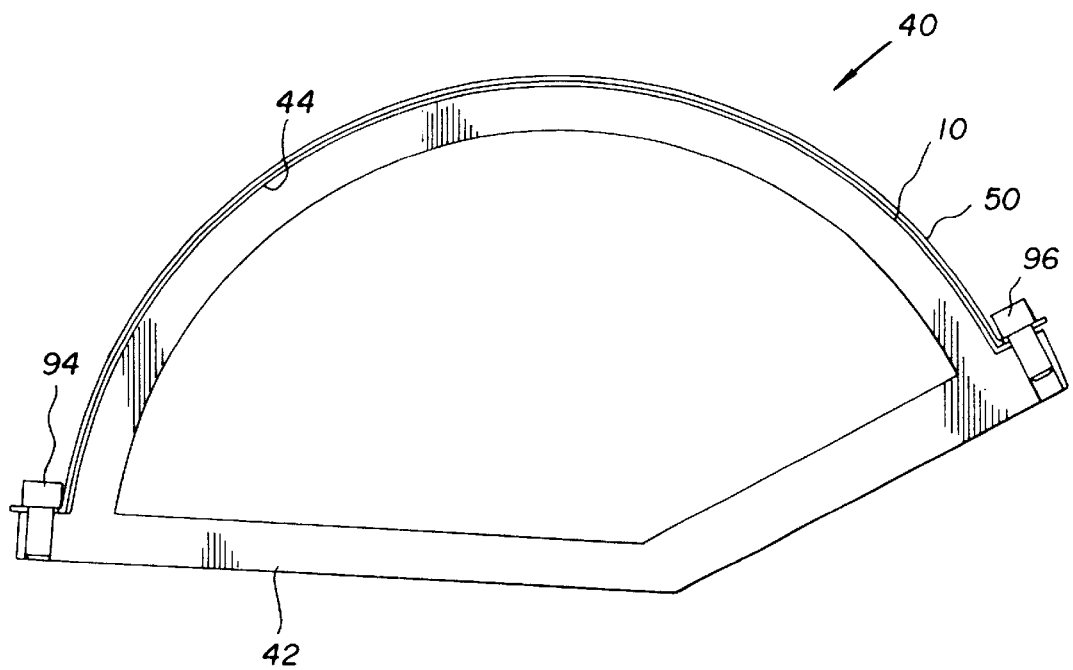
FIG. 18 shows a top view of a flexible lens mount wherein the retainer member is mounted outboard of the arc formed in the base member.

The first and second embodiments are shown such that the retainer member is disposed inside the arc of the base member. That is, the embodiments are shown such that the retainer member is located on the inside surface of the arc, with the retainer member being biased outward away from the center of the radius. However, retainer member could be disposed on the outside surface of the arc of the base member. FIG. 18 shows one possible arrangement. With the arrangement shown in FIG. 18, first and second ends 52,54 of retainer member 50 are constrained by means of fasteners 94,96. Fasteners 94,96 may be moved to adjust the force exerted to secure retainer member 50 to base member 42.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 flexible lens
12 planar first side
13 curved portion
14 planar second side
16 planar third side
18 planar fourth side
40 flexible lens mount; first embodiment
42 base member
43 support member
44 surface
46 surface
50 retainer member
52 first retainer end
54 second retainer end
46 channel in base member
58 leg
60 opening
62 fastener
64 opening in base member
70 groove; recess
72 curved portion
74 opening
80 second embodiment of flexible lens mount
82 base member
84 support member
86 surface
90 slots
92 second surface
94 fastener
96 fastener

What is claimed is:

1. A flexible lens mount for a flexible lens having a first side and a second side opposite the first side, comprising:
   a resilient member having a first end, a second end, and a first surface adapted to abut the second side of the flexible lens, the resilient member adapted to be flexed to form a first arc;
   a base member having (i) a second surface forming a second arc, the first and second arcs being substantially concentric, the second surface adapted to abut the first side of the flexible lens such that the flexible lens is disposed intermediate the first and second surfaces, (ii) a first retaining member disposed at one end to retain the first end of the resilient member, and (iii) a second retaining member disposed at an other end to retain the second end of the resilient member; and
   a fastener abutting either the first or second end of the resilient member to exert a force to secure the resilient member relative to the base member.

2. The flexible lens mount of claim 1, wherein the first arc is disposed inside the second arc.

3. The flexible lens mount of claim 1, wherein the second arc is disposed inside the first arc.

4. The flexible lens mount of claim 1, wherein the force exerted is adjustable by means of the fastener.

5. The flexible lens mount of claim 1, wherein the resilient member is biased toward the base member.

6. The flexible lens mount of claim 1, wherein the arc is preformed in the resilient member.

7. The flexible lens mount of claim 1, wherein the arc is not preformed in the resilient member.

8. The flexible lens mount of claim 1, wherein the fastener is a setscrew.

9. The flexible lens mount of claim 1, wherein the first arc of degrees D ranges from about 45 to about 180 degrees.

10. The flexible lens mount of claim 1, wherein the resilient member is comprised of a stainless spring steel.

11. The flexible lens mount of claim 1, wherein the first retaining member comprises a channel.

12. The flexible lens mount of claim 1, wherein the first retaining member comprises a substantially planar surface.

13. The flexible lens mount of claim 1, wherein the second end of the resilient member comprises a leg having a first opening therethrough.

14. The flexible lens mount of claim 13, wherein the base member includes a second opening in alignment with the first opening, and the fastener is disposed through the first and second openings.

15. The flexible lens mount of claim 1, wherein the first retaining member comprises a groove disposed in the base member adapted to support the resilient member and the flexible lens.

16. A flexible lens mount for a flexible lens having a first side and a second side opposite the first side, comprising:
   a flexible retainer member adapted to form a first arc of about a 180 degrees and having (i) a first surface adapted to abut the second side of the flexible lens, (ii) a first end, and (iii) a second end including a leg having a first opening therethrough;
   a base member having a second surface forming a second arc, the first and second arcs being substantially concentric, the second surface adapted to abut the first side of the flexible lens such that the flexible lens is disposed intermediate the base member and the flexible retainer member, the base member further comprising a channel disposed at one end to receive therein the first end of the flexible retainer member, and a second opening disposed at another end in axial alignment with the first opening; and
   a fastener disposed within the first and second openings to exert a force to secure the flexible retainer member against the base member, the force exerted being adjustable by movement of the fastener.

17. The flexible lens mount of claim 16, wherein the first arc is disposed inside the second arc.

18. The flexible lens mount of claim 16, wherein the second arc is disposed inside the first arc.

19. The flexible lens mount of claim 16, wherein the arc is preformed in the flexible retainer member.

20. The flexible lens mount of claim 16, wherein the arc is not preformed in the flexible retainer member.

21. The flexible lens mount of claim 16, wherein the flexible retainer member is comprised of a stainless spring steel.

* * * * *